United States Patent
Shao et al.

(10) Patent No.: US 11,511,184 B2
(45) Date of Patent: Nov. 29, 2022

(54) IN-GAME DISPLAY CONTROL METHOD AND APPARATUS, STORAGE MEDIUM PROCESSOR, AND TERMINAL

(71) Applicant: NETEASE (HANGZHOU) NETWORK CO., LTD., Zhejiang (CN)

(72) Inventors: Kun Shao, Zhejiang (CN); Zheng Jin, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/638,148

(22) PCT Filed: May 10, 2019

(86) PCT No.: PCT/CN2019/086463
§ 371 (c)(1),
(2) Date: Feb. 11, 2020

(87) PCT Pub. No.: WO2020/143147
PCT Pub. Date: Jul. 16, 2020

(65) Prior Publication Data
US 2021/0322865 A1    Oct. 21, 2021

(30) Foreign Application Priority Data
Jan. 10, 2019  (CN) .......................... 201910024148.1

(51) Int. Cl.
A63F 13/2145    (2014.01)
A63F 13/42      (2014.01)
(Continued)

(52) U.S. Cl.
CPC .......... *A63F 13/2145* (2014.09); *A63F 13/42* (2014.09); *A63F 13/5258* (2014.09); *A63F 13/56* (2014.09); *A63F 13/92* (2014.09)

(58) Field of Classification Search
CPC ................ A63F 13/214; A63F 13/2145; A63F 13/5258; A63F 13/92
See application file for complete search history.

(56) References Cited

U.S. PATENT DOCUMENTS 10,702,771 B2 *  7/2020  Miller ..................... A63F 13/27
10,715,846 B1 *  7/2020  Tulewicz ............. H04N 21/482
(Continued)

FOREIGN PATENT DOCUMENTS

CN    107823882 A    3/2018
CN    107890664 A    4/2018
(Continued)

*Primary Examiner* — Chase E Leichliter
(74) *Attorney, Agent, or Firm* — Gang Yu

(57) ABSTRACT

An in-game display control method and apparatus, a storage medium, a processor, and a terminal are provided. The method includes: a first touch operation acting on a preset area of a graphical user interface is detected; a scene display area is updated according to the first touch operation; and when a preset specific event is detected to exist a preset area of a game scene position corresponding to a touch point of the first touch operation, an update mode of the scene display area is adjusted according to the specific event. The present disclosure solves a technical problem that an adjustment mode of an in-game virtual lens provided in the related art has a single operation mode, lacks favorable adaptability and scalability, and cannot meet the game experience requirements of game players at different levels.

19 Claims, 3 Drawing Sheets

(51) Int. Cl.
*A63F 13/5258* (2014.01)
*A63F 13/56* (2014.01)
*A63F 13/92* (2014.01)

(56) References Cited

U.S. PATENT DOCUMENTS

| | | | | |
|---|---|---|---|---|
| 2007/0270215 | A1* | 11/2007 | Miyamoto | A63F 13/10 463/32 |
| 2007/0298881 | A1* | 12/2007 | Kawamura | A63F 13/833 463/33 |
| 2008/0125202 | A1* | 5/2008 | Kamiyama | A63F 13/06 463/43 |
| 2009/0104990 | A1* | 4/2009 | Tsujino | A63F 13/57 463/32 |
| 2010/0069159 | A1* | 3/2010 | Yamada | A63F 13/45 463/43 |
| 2010/0292011 | A1* | 11/2010 | Kira | A63F 13/533 463/43 |
| 2011/0113383 | A1* | 5/2011 | Dyack | G06T 15/20 715/850 |
| 2012/0001944 | A1* | 1/2012 | Sakurai | G06F 3/04815 345/671 |
| 2012/0007882 | A1* | 1/2012 | Sakurai | G06F 3/04883 345/619 |
| 2014/0066195 | A1* | 3/2014 | Matsui | A63F 13/06 463/30 |
| 2014/0066200 | A1* | 3/2014 | Matsui | A63F 13/45 463/31 |
| 2016/0184699 | A1* | 6/2016 | Rageh | A63F 13/525 463/33 |
| 2016/0361648 | A1* | 12/2016 | Kim | A63F 13/426 |
| 2017/0151499 | A1* | 6/2017 | Hirai | A63F 13/2145 |
| 2017/0291108 | A1* | 10/2017 | Kim | A63F 13/525 |
| 2018/0028918 | A1* | 2/2018 | Tang | A63F 13/5378 |
| 2018/0056188 | A1* | 3/2018 | Miyamoto | A63F 13/42 |
| 2018/0121086 | A1* | 5/2018 | Wang | G06F 3/04886 |
| 2018/0147488 | A1* | 5/2018 | Tang | A63F 13/2145 |
| 2018/0311579 | A1* | 11/2018 | Matsui | A63F 13/2145 |
| 2019/0070495 | A1* | 3/2019 | He | A63F 13/847 |
| 2019/0083885 | A1* | 3/2019 | Yee | G06F 3/04815 |
| 2019/0083887 | A1* | 3/2019 | Tan | A63F 13/56 |
| 2019/0129612 | A1* | 5/2019 | Dohno | A63F 13/2145 |
| 2019/0215372 | A1* | 7/2019 | Quan | A63F 13/533 |
| 2019/0255437 | A1* | 8/2019 | Wang | A63F 13/355 |
| 2019/0287302 | A1* | 9/2019 | Bhuruth | H04N 21/854 |
| 2020/0106967 | A1* | 4/2020 | Yee | G06F 3/04883 |
| 2020/0282308 | A1* | 9/2020 | Guo | A63F 13/537 |
| 2020/0316473 | A1* | 10/2020 | Qiu | G06F 3/04815 |
| 2021/0322865 | A1* | 10/2021 | Shao | A63F 13/56 |

FOREIGN PATENT DOCUMENTS

| | | |
|---|---|---|
| CN | 108170295 A | 6/2018 |
| CN | 108905212 A | 11/2018 |
| CN | 108920084 A | 11/2018 |
| CN | 109568956 A | 4/2019 |

* cited by examiner

IN-GAME DISPLAY CONTROL METHOD AND APPARATUS, STORAGE MEDIUM PROCESSOR, AND TERMINAL

CROSS-REFERENCE TO RELATED APPLICATIONS

The present disclosure claims priority of Chinese Patent Application No. 201910024148.1, filed to China Patent Office on Oct. 1, 2019. Contents of the present disclosure are hereby incorporated by reference in entirety of the Chinese Patent Application.

TECHNICAL FIELD

The present disclosure relates to the field of computers, and in particular to an in-game display control method and apparatus, a storage medium, a processor, and a terminal.

BACKGROUND

At present, in mainstream Multiplayer Online Battle Arena (MOBA) mobile games, game scenes are usually observed by a basic manner of fixed lens and lens dragging. In addition, some games will carry out targeted lens interaction design for a few specific types of heroic characters based on the basic manner of fixed lens and lens dragging. Or, some games will also carry out supplementary design in terms of specific lenses. For example, game players may manually switch a lens height mode.

The fixed lens means that a center of the lens is fixed on the body of a game character model by default, and a height of the lens is a fixed value by default. A game player may move a camera by clicking and dragging on a specific area of a screen, and a drag speed of the camera is different in different types of games. In some MOBA mobile games, the longest drag distance may reach ¼ of the maximum battlefield length. In another part of the MOBA mobile games, the longest drag distance may reach almost the entire battlefield.

In addition, when a game player clicks on a mini map in a user interface, the camera will be immediately moved to the clicked position; and when the game player continuously performs a dragging operation after performing the clicking operation, the camera will also follow the movement until the game player releases the hand, and the camera will automatically return to an initial position of this camera.

However, in the current MOBA mobile games on the market, due to limitation of a two-handed interaction mode, most of the games use a fixed lens and lens dragging solution to meet demands of game players for battlefield horizon and lens operations. However, according to the above analysis, it can be known that this solution combining a fixed lens and an active dragging lens can meet the most basic functional requirements, lacks favorable adaptability and scalability for special situations and operations that occur in the game, and cannot meet game experience needs of game players at different levels.

As to the problem mentioned above, no effective solution has been provided yet.

SUMMARY

At least some embodiments of the present disclosure provide an in-game display control method and apparatus, a storage medium, a processor, and a terminal, so as to at least partially solve a technical problem that an adjustment mode of an in-game virtual lens provided in the related art has a single operation mode, lacks favorable adaptability and scalability, and cannot meet game experience requirements of game players at different levels.

In an embodiment of the present disclosure, an in-game display control method is provided. This method is applied to a mobile terminal having at least one processor for executing a software application and a touch screen which is rendered with a graphical user interface. A game scene of a game may include a scene display area. The scene display area may be at least part of the game scene. Contents rendered on the graphical user interface may include the scene display area. The method may include that:

a first touch operation acting on a preset area of a graphical user interface is detected; a scene display area is updated according to the first touch operation; and when a preset specific event is detected to exist in a preset area of a game scene position corresponding to a touch point of the first touch operation, an update mode of the scene display area is adjusted according to the specific event.

Optionally, the operation that the update mode of the scene display area is adjusted according to the specific event may include that: an update direction of the scene display area in the game scene is adjusted according to a position where the specific event occurs.

Optionally, the operation that the scene display area is updated according to the first touch operation may include that: an update direction of the scene display area in the game scene is determined according to a movement direction of the touch point of the first touch operation, and the scene display area is updated according to the update direction; and the operation that the update mode of the scene display area is adjusted according to the specific event may include that: an update speed of the scene display area in the game scene along the update direction is adjusted according to a position where the specific event occurs.

Optionally, the operation that the scene display area is updated according to the first touch operation may include that: an update speed of the scene display area is adjusted with a first sensitivity according to a movement track of the touch point of the first touch operation.

Optionally, when the specific event is detected to exist in the preset area of the game scene position, the operation that the update speed of the scene display area is adjusted according to the specific event may include that: a movement direction of the touch point of the first touch operation is detected; and when the specific event is detected to exist in the preset area of the game scene position and the movement direction towards the specific event, the update speed of the scene display area is adjusted according to a second sensitivity.

Optionally, a virtual camera corresponding to a preset virtual character may be configured in the game scene, and the scene display area may be an area shot by the virtual camera.

Optionally, the operation that the scene display area is updated according to the first touch operation may include that: the virtual camera is controlled to move at a first preset speed according to the movement track of the touch point of the first touch operation, and the update speed of the scene display area is adjusted with a first sensitivity.

Optionally, when the specific event is detected to exist in the preset area of the game scene position, the operation that the update speed of the scene display area is adjusted according to the specific event may include that: a movement direction of the touch point of the first touch operation is detected; and when the specific event is detected to exist in the preset area of the game scene position and the movement direction towards the specific event, the virtual camera is controlled to move at a second preset speed according to the movement track of the touch point of the first touch operation, and the update speed of the scene display area is adjusted with a second sensitivity.

Optionally, after controlling the virtual camera to move to the specific event, the method may further include that: the movement direction is detected; and when the movement direction is away from the specific event, the virtual camera is controlled to move at a third preset speed according to the movement track of the touch point of the first touch operation to adjust the update speed of the scene display area.

Optionally, after controlling the virtual camera to move to the specific event, the method may further include that: when the first touch operation ends, the virtual camera is fixed at a position where the specific event occurs.

Optionally, the method may further include that: a second touch operation acting on a preset position in the graphical user interface is detected; and the virtual camera is controlled to restore to a preset virtual character according to the second touch operation.

Optionally, the method may further include that: a third touch operation acting on a movement control area in the graphical user interface is detected; the preset virtual character is controlled to move in the game scene according to the third touch operation; and when the preset virtual character is detected to move to a preset area of the specific event, the virtual camera is controlled to restore to the preset virtual character.

Optionally, the method may further include that: when the specific event ends, the virtual camera is controlled to restore to the preset virtual character.

Optionally, the method may further include that: when the first touch operation ends, the virtual camera is controlled to restore to the preset virtual character.

In another embodiment of the present disclosure, an in-game display control apparatus is also provided. This apparatus is applied to a mobile terminal having at least one processor for executing a software application and a touch screen which is rendered with a graphical user interface. A game scene of a game may include a scene display area. The scene display area may be at least part of the game scene. Contents rendered on the graphical user interface may include the scene display area. The apparatus may include:

a detection component, configured to detect a first touch operation acting on a preset area of the graphical user interface; an update component, configured to update the scene display area according to the first touch operation; and an adjustment component, configured to, when a preset specific event is detected to exist in a preset area of a game scene position corresponding to a touch point of the first touch operation, adjust an update mode of the scene display area according to the specific event.

Optionally, the adjustment component may be configured to adjust an update direction of the scene display area in the game scene according to a position where the specific event occurs.

Optionally, the update component may include: a determination element, configured to determine an update direction of the scene display area in the game scene according to a movement direction of the touch point of the first touch operation; and an update element, configured to update the scene display area according to the update direction. The adjustment component may be configured to adjust an update speed of the scene display area in the game scene in the update direction according to a position where the specific event occurs.

Optionally, the update component may be configured to adjust an update speed of the scene display area with a first sensitivity according to a movement track of the touch point of the first touch operation.

Optionally, the adjustment component may include: a first detection element, configured to detect a movement direction of the touch point of the first touch operation; and a first adjustment element, configured to, when the specific event is detected to exist in the preset area of the game scene position and the movement direction towards the specific event, adjust the update speed of the scene display area according to a second sensitivity.

Optionally, a virtual camera corresponding to a preset virtual character may be configured in the game scene, and the scene display area may be an area shot by the virtual camera.

Optionally, the update component may be configured to control the virtual camera to move at a first preset speed according to the movement track of the touch point of the first touch operation, and adjust the update speed of the scene display area with a first sensitivity.

Optionally, the adjustment component may include: a second detection element, configured to detect a movement direction of the touch point of the first touch operation; and a second adjustment element, configured to, when the specific event is detected to exist in the preset area of the game scene position and the movement direction towards the specific event, control the virtual camera to move at a second preset speed according to the movement track of the touch point of the first touch operation, and adjust the update speed of the scene display area with a second sensitivity.

Optionally, the apparatus may further include: a first processing component, configured to detect the movement direction, and, when the movement direction is away from the specific event, control the virtual camera to move at a third preset speed according to the movement track of the touch point of the first touch operation to adjust the update speed of the scene display area.

Optionally, the apparatus may further include: a second processing component, configured to, when the first touch operation ends, fix the virtual camera at a position where the specific event occurs.

Optionally, the apparatus may further include: a first reset component, configured to detect a second touch operation acting on a preset position in the graphical user interface, and control the virtual camera to restore to a position of a preset virtual character according to the second touch operation.

Optionally, the detection component may be further configured to detect a third touch operation acting on a movement control area in the graphical user interface. The apparatus may further include: a control component, configured to control the preset virtual character to move in the game scene according to the third touch operation; and a second reset component, configured to, when the preset virtual character is detected to move to a preset area of the specific event, control the virtual camera to restore to a position of the preset virtual character.

Optionally, the apparatus may further include: a third reset component, configured to, when the specific event ends, control the virtual camera to restore to a position of the preset virtual character.

Optionally, the apparatus may further include: a fourth reset component, configured to, when the first touch operation ends, control the virtual camera to restore to a position of the preset virtual character.

In another embodiment of the present disclosure, a storage medium is also provided, which may include a stored program. When the stored program is run, a device where the storage medium is located may be controlled to perform the in-game display control method as mentioned above.

In another embodiment of the present disclosure, a processor is also provided.

The processor may be configured to run a program. When the program is run, the in-game display control method as mentioned above may be performed.

In another embodiment of the present disclosure, a terminal is also provided. The terminal may include at least one processor, a memory, a display device and at least one program. The at least one program may be stored in the memory, and configured to be executed by the at least one processor. The at least one processor may be configured to perform the in-game display control method as mentioned above.

In at least some embodiments of the present disclosure, the first touch operation acting on the preset area of the graphical user interface is detected, the scene display area is updated according to the first touch operation, and when the preset specific event is detected to exist in the preset area of the game scene position corresponding to the touch point of the first touch operation, the update mode of the scene display area is adjusted according to the specific event, thereby achieving an aim of adjusting the update mode of the scene display area according to the specific event existing in the preset area of the game scene position corresponding to the touch point of the first touch operation. Therefore, a technical effect of realizing an intelligent scene display area adjustment mode to make the scene display area adjustment mode more flexible and intelligent is achieved, thereby solving the technical problem that the adjustment mode of the in-game virtual lens provided in the related art has a single operation mode, lacks favorable adaptability and scalability, and cannot meet the game experience requirements of game players at different levels.

BRIEF DESCRIPTION OF THE DRAWINGS

The accompanying drawings described herein are used for providing a further understanding of the present disclosure, and constitute a part of the present application, and exemplary embodiments of the present disclosure and the description thereof are used for explaining the present disclosure, but do not constitute improper limitations to the present disclosure. In the drawings.

DETAILED DESCRIPTION

Figure 1:
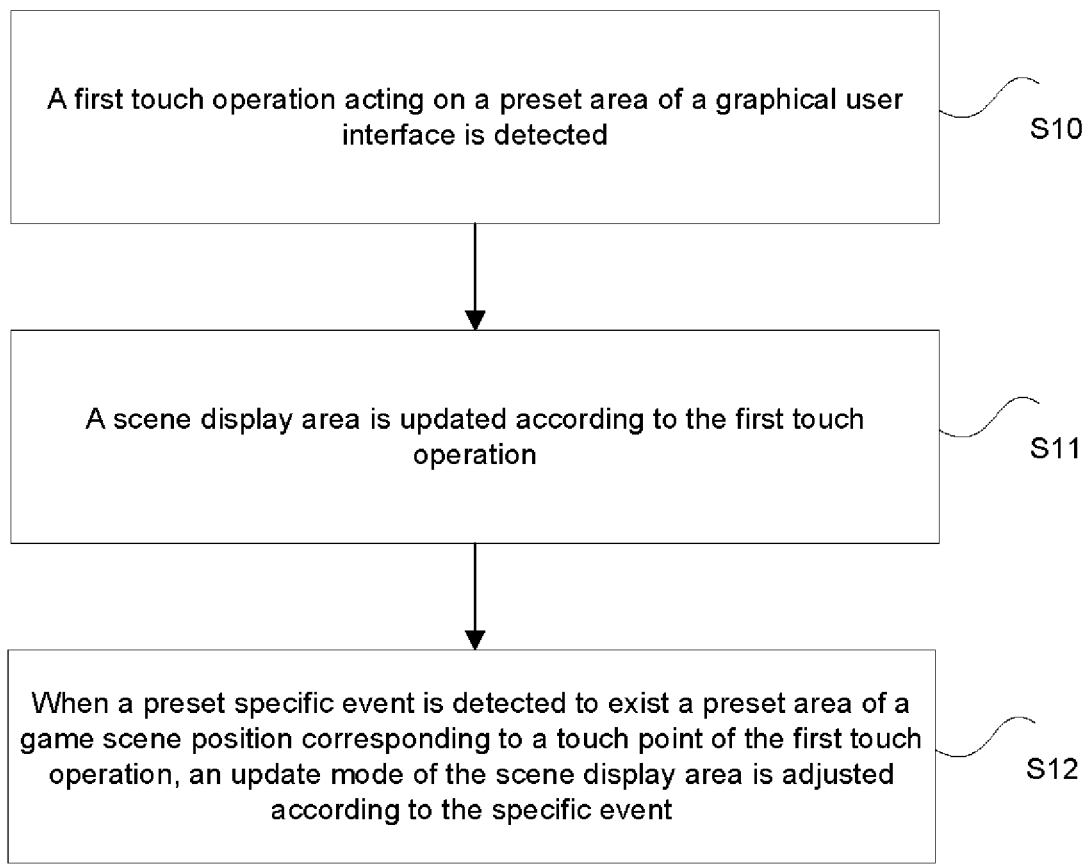
FIG. 1 is a flowchart of an in-game display control method according to an embodiment of the present disclosure.

In order to make those skilled in the art better understand the solutions of the present disclosure, technical solutions in embodiments of the present disclosure will be clearly and completely described below with reference to the drawings in the embodiments of the present disclosure. It is apparent that the described embodiments are a part of the embodiments of the present disclosure, not all of the embodiments. On the basis of the embodiments of the present disclosure, all other embodiments obtained on the premise of no creative work of those of ordinary skill in the art should fall within the scope of protection of the present disclosure.

It is to be noted that the specification and claims of the disclosure and the terms "first", "second" and the like in the drawings are used for distinguishing similar objects, and do not need to describe a specific sequence or a precedence order. It will be appreciated that data used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

In an embodiment of the present disclosure, an in-game display control method is provided. It is to be noted that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

The method embodiment may be implemented in a mobile terminal, a computer terminal or a similar computing device. Running on the mobile terminal is taken as an example. The mobile terminal may include at least one processor (the at least one processor may include but is not limited to a processing device such as a Central Processing Unit (CPU), a Graphics Processing Unit (GPU), a Digital Signal Processing (DSP) chip, a Micro Controller Unit (MCU) or a Field Programmable Gate Array (FPGA)) and a memory configured to store data. Optionally, the mobile terminal may further include a transmission apparatus and an input/output device for communication functions. Those skilled in the art can understand that the above structural description is merely illustrative, and does not limit the structure of the above mobile terminal. For example, the mobile terminal may further include more or less components than those described in the above structural description, or have a configuration different from that described above.

The memory may be configured to store a computer program, for example, a software program and component of application software, such as a computer program corresponding to the in-game display control method in the embodiment of the present disclosure, and the processor executes various functional applications and data processing by running the computer program stored in the memory, that is, implements the above in-game display control method. The memory may include a high speed random access memory and may also include a non-volatile memory such as at least one magnetic storage device, a flash memory, or other non-volatile solid state memories. In some examples, the memory may further include memories remotely located relative to the processor, which may be connected to the mobile terminal over a network. The examples of such networks include, but are not limited to, the Internet, the Intranet, local area networks, mobile communication networks, and combinations thereof.

The transmission device is configured to receive or send data via a network. The above specific network example may include a wireless network provided by a communication provider of the mobile terminal. In one example, the transmission device includes a Network Interface Controller (NIC) that may be connected to other network devices through a base station to communicate with the Internet. In one example, the transmission device may be a Radio Frequency (RF) component for communicating with the Internet wirelessly.

In the present embodiment, an in-game display control method running on the above mobile terminal is provided. This method is applied to a mobile terminal having at least one processor for executing a software application and a touch screen which is rendered with a graphical user interface. A game scene of a game includes a scene display area. The scene display area is at least part of the game scene. Contents rendered on the graphical user interface include the scene display area. FIG. 1 is a flowchart of an in-game display control method according to an embodiment of the present disclosure. As shown in FIG. 1, the method includes the following steps.

At step S10, a first touch operation acting on a preset area of a graphical user interface is detected.

At step S11, a scene display area is updated according to the first touch operation.

At step S12, when a preset specific event is detected to exist in a preset area of a game scene position corresponding to a touch point of the first touch operation, an update mode of the scene display area is adjusted according to the specific event.

By means of the above steps, the first touch operation acting on the preset area of the graphical user interface is detected, the scene display area is updated according to the first touch operation, and when the preset specific event is detected to exist in the preset area of the game scene position corresponding to the touch point of the first touch operation, the update mode of the scene display area is adjusted according to the specific event, thereby achieving an aim of adjusting the update mode of the scene display area according to the specific event existing in the preset area of the game scene position corresponding to the touch point of the first touch operation. Therefore, a technical effect of realizing an intelligent scene display area adjustment mode to make the scene display area adjustment mode more flexible and intelligent is achieved, thereby solving the technical problem that the adjustment mode of the in-game virtual lens provided in the related art has a single operation mode, lacks favorable adaptability and scalability, and cannot meet the game experience requirements of game players at different levels.

The preset area may be a horizon adjustment area on the graphical user interface. In the present embodiment, the horizon adjustment area may be an invisible touch area. The game player may update the scene display area by a lens dragging operation (equivalent to the above first touch operation). The preset area may also be a mini map area on the graphical user interface, and the game player may update the scene display area by clicking or sliding operations (equivalent to the above first touch operation).

The above specific event may be an event that has an important impact on a progress of the game, such as team battles, residual blood hunting, rescue, and hunting of important monsters. After a specific event is determined, a specific area may be generated around the position where the specific event occurs, which may be the smallest circle covering all the virtual characters participating in the specific event.

In the related art, the game player can update the scene display area by performing a clicking operation in the mini map area or a dragging operation in the horizon adjustment area. However, when viewing the specific event in this operation mode, it is possible to observe the specific event by constantly adjusting the horizon area manually by the game player, and it is very likely that the best opportunity for combat has been missed at this time. Conversely, by means of the technical solution provided by this embodiment of the present disclosure, when the specific event is detected to exist in the preset area of the game scene position corresponding to the touch point of the first touch operation, the update mode of the scene display area may be automatically adjusted according to the specific event. Therefore, the specific event can be viewed as soon as possible in the shortest time, so as to respond to the specific event in time.

Optionally, at step S12, the operation that the update mode of the scene display area is adjusted according to the specific event may include the following execution steps.

At step S121, an update direction of the scene display area in the game scene is adjusted according to a position where the specific event occurs.

In the process of updating the scene display area according to the first touch operation, when the specific event is detected to exist in the preset area of the game scene position corresponding to the touch point of the first touch operation, the update direction of the scene display area in the game scene is adjusted according to the position where the specific event occurs. At this time, the preset area is disabled. That is, in the process of updating the scene display area by the game player through the first touch operation, when the specific event is detected to exist in the preset area of the game scene position corresponding to the touch point of the first touch operation, the preset area no longer responds to the game player to update the scene display area according to the first touch operation. At this time, the scene display area is automatically updated toward the position where the specific event occurs.

In other embodiments, when the preset specific event is detected to exist in the preset area of the game scene position corresponding to the touch point of the first touch operation, step S121 may further include that: the preset area is disabled.

In an optional embodiment, the game player may determine whether to set a trigger condition for "adjusting the update mode of the scene display area according to the specific event" in game settings according to actual needs. When a trigger condition is not set and the specific event is detected to exist in the preset area of the game scene position corresponding to the touch point of the first touch operation, the operation of "adjusting the update mode of the scene display area according to the specific event" will be automatically performed. When trigger condition is set, on the basis of detecting that the specific event exists in the preset area of the game scene position corresponding to the touch point of the first touch operation, it is also necessary to adjust the update mode of the scene display area according to the specific event when a preset action of the first touch operation is detected. For example, when a long-press action (equivalent to the above preset action) of the game player is detected, the operation of "adjusting the update mode of the scene display area according to the specific event" will be triggered.

Optionally, at step S11, the operation that the scene display area is updated according to the first touch operation may include the following execution steps.

At step S111, an update direction of the scene display area in the game scene is determined according to a movement direction of the touch point of the first touch operation.

At step S112, the scene display area is updated according to the update direction.

At step S12, the operation that an update mode of the scene display area is adjusted according to the specific event may include the following execution steps.

At step S122, an update speed of the scene display area in the game scene along the update direction is adjusted according to a position where the specific event occurs.

The touch point of the first touch operation is usually a contact position between a fingertip of a game player and a display device (such as a liquid crystal display screen) of a terminal. During a dragging operation (equivalent to the above first touch operation) performed by the game player on the display device, the movement direction of the touch point may be used for determining the update direction of the scene display area in the game scene, and then the scene display area is updated according to the update direction. When determining that the specific event exists in the above update direction and the specific event is located in the preset area of the game scene position corresponding to the touch point, the update speed of the scene display area in the game scene along the update direction may be adjusted. That is, the update speed of the scene display area in the game scene along the update direction is increased, so that the game player can pay attention to the specific event as soon as possible.

Optionally, at step S11, the operation that a scene display area is updated according to the first touch operation may include the following execution steps.

At step S113, an update speed of the scene display area is adjusted with a first sensitivity according to a movement track of the touch point of the first touch operation.

During a dragging operation (equivalent to the above first touch operation) performed by the game player on a display device, a corresponding movement track is generated. The movement track is a set of touch points generated by the first touch operation at serial time points and at different positions. In view of a preset mapping relationship between the displacement change of the touch point and the above first sensitivity, the displacement change of the touch point may be determined according to the movement track of the touch point, and the above first sensitivity is determined according to the mapping relationship, so as to adjust the update speed of the scene display area according to the first sensitivity. The above displacement change may be obtained by calculating the displacement change between two adjacent frames of images, or obtained by calculating the displacement change between a starting touch point and an ending touch point of the movement track.

Optionally, when the specific event is detected to exist in the preset area of the game scene position corresponding to the touch point of the first touch operation, at step S12, the operation that the update speed of the scene display area is adjusted according to the specific event may include the following execution steps.

At step S123, a movement direction of the touch point of the first touch operation is detected.

At step S124, when the specific event is detected to exist in the preset area of the game scene position corresponding to the touch point of the first touch operation and the movement direction towards the specific event, the update speed of the scene display area is adjusted according to a second sensitivity.

After detecting that the specific event is detected to exist in the preset area of the game scene position corresponding to the touch point of the first touch operation, it is also necessary to further detect the movement direction of the touch point of the first touch operation. When the specific event is detected to exist in the preset area of the game scene position corresponding to the touch point of the first touch operation and the movement direction towards the specific event, the update speed of the scene display area may be adjusted according to the second sensitivity. That is, the update speed of the scene display area in the game scene along the update direction is increased, so that the game player can pay attention to the specific event as soon as possible.

Optionally, a virtual camera corresponding to a preset virtual character may be configured in the game scene, and the scene display area may be an area shot by the virtual camera.

In an optional embodiment, the virtual camera may be fixed on a preset virtual character controlled by the game player, move according to the movement of the virtual character, and rotate according to the rotation of the virtual character, which is similar to a subjective perspective of the virtual character. Therefore, the scene display area in the game scene is an area shot by the virtual camera. Of course, the game may also be set at a position relative to the preset virtual character controlled by the game player, for example, set at a preset position above the preset virtual character and follow the virtual character to move, which is similar to a third party's perspective of the virtual character. Therefore, the scene display area in the game scene is an area shot by the virtual camera. The following optional embodiments mainly take the virtual camera fixed at a relative position of a virtual character controlled by a game player as an example for detailed description. The implementation process is also applicable to setting the virtual camera on a virtual character controlled by a game player.

Optionally, at step S11, the operation that the scene display area is updated according to the first touch operation may include the following execution steps.

At step S114, the virtual camera is controlled to move at a first preset speed according to the movement track of the touch point of the first touch operation, and the update speed of the scene display area is adjusted with a first sensitivity.

During a dragging operation (equivalent to the above first touch operation) performed by the game player on a display device, a corresponding movement track is generated. The movement track is a set of touch points generated by the first touch operation at serial time points and at different positions. In view of a preset mapping relationship among the displacement change of the touch point, the movement speed of the virtual camera and the above first sensitivity, the displacement change of the touch point may be determined according to the movement track of the touch point, the virtual camera is controlled to move at a first preset speed according to the mapping relationship, and the above first sensitivity is determined according to the mapping relationship, so as to adjust the update speed of the scene display area according to the first sensitivity. The above displacement change may be obtained by calculating the displacement change between two adjacent frames of images, or obtained by calculating the displacement change between a starting touch point and an ending touch point of the movement track.

Optionally, when the specific event is detected to exist in the preset area of the game scene position corresponding to the touch point of the first touch operation, at step S12, the operation that the update speed of the scene display area is adjusted according to the specific event may include the following execution steps.

At step S125, a movement direction of the touch point of the first touch operation is detected.

At step S126, when the specific event is detected to exist in the preset area of the game scene position corresponding to the touch point of the first touch operation and the movement direction towards the specific event, the virtual camera is controlled to move at a second preset speed according to the movement track of the touch point of the first touch operation, and the update speed of the scene display area is adjusted with a second sensitivity.

After detecting that the specific event exists in the preset area of the game scene position corresponding to the touch point of the first touch operation, it is also necessary to further detect the movement direction of the touch point of the first touch operation. When the specific event is detected to exist in the preset area of the game scene position corresponding to the touch point of the first touch operation and the movement direction towards the specific event, in view of a preset mapping relationship among the displacement change of the touch point, the movement speed of the virtual camera and the above second sensitivity, the displacement change of the touch point may be determined according to the movement track of the touch point, the virtual camera is controlled to move at a second preset speed according to the mapping relationship, and the above second sensitivity is determined according to the mapping relationship, so as to adjust the update speed of the scene display area according to the second sensitivity. That is, the movement speed of the virtual camera and the update speed of the scene display area in the game scene along the update direction are increased simultaneously, so that the game player can pay attention to the specific event as soon as possible.

Optionally, at step S126, when the specific event is detected to exist in the preset area of the game scene position corresponding to the touch point of the first touch operation and the movement direction towards the specific event, the virtual camera is controlled to move at a second preset speed according to the movement track of the touch point of the first touch operation, and the update speed of the scene display area is adjusted with a second sensitivity. The method may further include the following execution steps.

At step S1261, a position of the virtual camera in the game scene is acquired.

At step S1262, when the position of the virtual camera is outside a specific area of the specific event, the virtual camera is controlled to move toward the specific area at the second preset speed according to the movement track of the touch point of the first touch operation.

At step S1263, when the position of the virtual camera is inside the specific area of the specific event, the virtual camera is controlled to move at a fourth preset speed according to the movement track of the touch point of the first touch operation, and the fourth preset speed is less than the second preset speed.

Specifically, in an optional implementation process, when the game player controls the virtual camera to move by dragging the lens with a clicking operation in a preset area (for example, a horizon adjustment area or a mini map area), and a specific event exists in a dragging direction (that is, the above movement direction), the virtual camera is controlled to move at a second preset speed. That is, the moving speed will increase immediately until the virtual camera enters a specific area where the specific event is located. After the virtual camera enters the specific area where the specific event is located, the virtual camera is controlled to move at a fourth preset speed. That is, the movement speed will immediately decrease until the virtual camera leaves the specific area where the specific event is located. After the virtual camera leaves the specific area where the specific event is located, the movement speed of the virtual camera will immediately increase until the virtual camera is away from the specific area where the specific event is located.

Optionally, after the virtual camera is controlled to move to the specific event at step S126, the method may further include the following execution steps.

At step S127, a movement direction is detected.

At step S128, when the movement direction is away from the specific event, the virtual camera Is controlled to move at a third preset speed according to the movement track of the touch point of the first touch operation to adjust the update speed of the scene display area.

By increasing the movement speed of the virtual camera and the update speed of the scene display area in the game scene along the update direction, after the virtual camera continuously approaches in the movement direction until the virtual camera enters the area where the specific event is located, the displacement change of the touch point may be determined according to the movement track of the touch point of the first touch operation, and the virtual camera is further controlled according to a preset mapping relationship between the displacement change of the touch point and the movement speed of the virtual camera to adjust the update speed of the scene display area. That is, the movement speed of the virtual camera is increased, so that the game player can observe remaining display areas in the game scene as soon as possible.

Optionally, after the virtual camera is controlled to move to the specific event at step S126, the method may further include the following execution steps.

At step S129, when the first touch operation ends, the virtual camera is fixed at a position where the specific event occurs.

In an optional embodiment, when the operation process of the game player performing a dragging operation (equivalent to the above first touch operation) on the display device ends, the virtual camera may be selected to be fixed at any position in the area where the specific event is located, so that the game player can keep an eye on the progress of the game for the specific event.

Optionally, on the basis of steps S10 to S12, the following execution steps may be further included.

At step S13, a second touch operation acting on a preset position in the graphical user interface is detected.

At step S14, the virtual camera is controlled to restore to a preset virtual character according to the second touch operation.

When the virtual camera is fixed at any position in the area where the specific event is located after the operation process of the game player performing a dragging operation (equivalent to the above first touch operation) on the display device ends, it is also necessary to set a corresponding virtual camera reset operation (equivalent to the above second touch operation), which may be a touch operation acting on a specific cancel control, or a touch operation acting on any blank area in the graphical user interface. Therefore, the virtual camera may be controlled to restore to a preset virtual character controlled by the game player through the second touch operation. This state may be calculated by lens logic to automatically reset the virtual camera to the current position of the preset virtual character to restore an original scene display area.

Optionally, on the basis of steps S10 to S12, the following execution steps may be further included.

At step S15, a third touch operation acting on a movement control area in the graphical user interface is detected.

At step S16, the preset virtual character is controlled to move in the game scene according to the third touch operation.

At step S17, when the preset virtual character is detected to move to a preset area of the specific event, the virtual camera is controlled to restore to the preset virtual character.

The movement control area may be a direction control (for example, a virtual joystick for controlling a direction in the graphical user interface). The game player may control the preset virtual character to move in the game scene during the dragging operation (equivalent to the above third touch operation) on the movement control area. When the preset virtual character moves to the area where the specific event is located (that is, the scene display area including the specific event), the virtual camera may be controlled to restore to the preset virtual character. That is, when the preset virtual character is outside the area where the specific event is located, the position of the virtual camera is continuously shifted to the area where the specific event is located until the virtual camera enters the area where the specific event is located. Further, when the preset virtual character moves into the area where the specific event is located, the virtual camera will restore to the preset virtual character.

Optionally, on the basis of steps S10 to S12, the following execution steps may be further included.

At step S18, when the specific event ends, the virtual camera is controlled to restore to the preset virtual character.

When the specific event (for example, the end of a team fight) ends, the virtual camera may be reset to the preset virtual character at this time regardless of whether the preset virtual character moves at the initial position. That is, the virtual camera is positioned at the current position of the preset virtual character.

Optionally, on the basis of steps S10 to S12, the following execution steps may be further included.

At step S19, when the first touch operation ends, the virtual camera is controlled to restore to the preset virtual character.

In an optional embodiment, when the operation process of the game player performing a dragging operation (equivalent to the above first touch operation) on the display device ends, the virtual camera may be selected to be reset to the preset virtual character at this time, so that the game player can determine the next movement direction of the preset virtual character. For example, the preset virtual character is controlled to move towards the area where the specific event is located.

The above optional implementation process will be further described in detail in combination with the following two optional embodiments.

Figure 2:
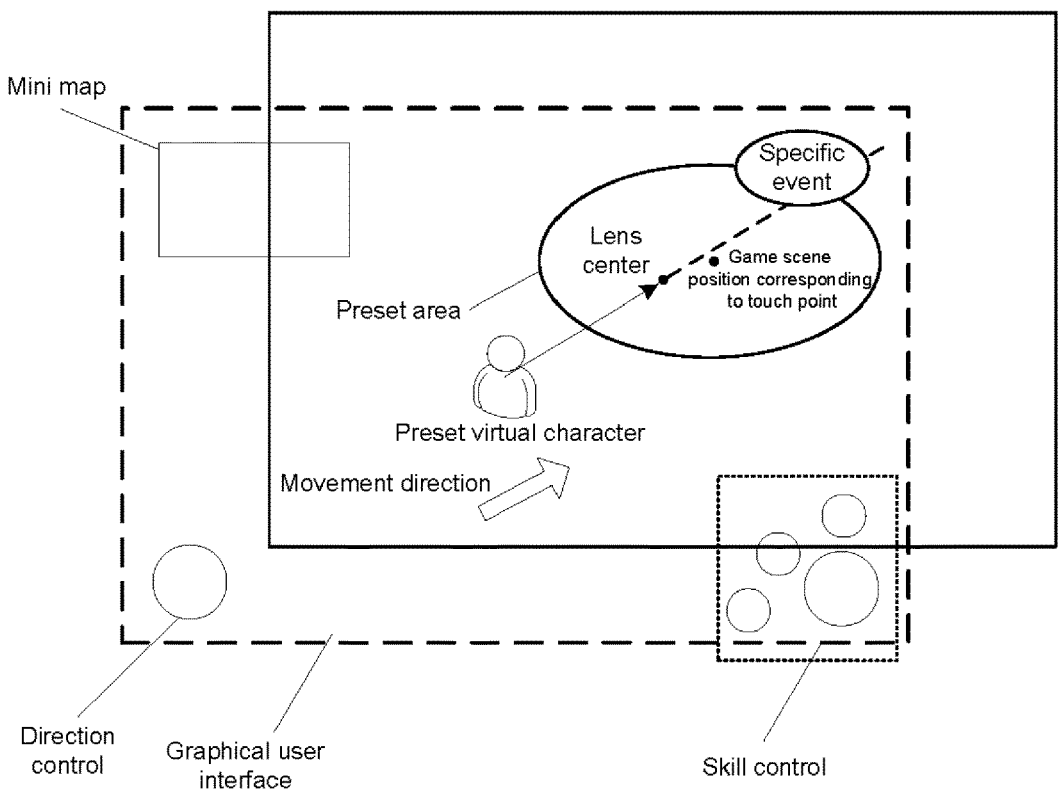
FIG. 2 is a schematic diagram of an in-game display control method according to a first optional embodiment of the present disclosure.

FIG. 2 is a schematic diagram of an in-game display control method according to a first optional embodiment of the present disclosure. As shown in FIG. 2, when a game player performs dragging of a lens of a virtual camera in an area not blocked by a control and a mini map in a graphical user interface to make the virtual camera move, a corresponding movement track is generated. The displacement change of the touch point may be determined according to the movement track of the touch point of the dragging operation, thereby determining the movement speed of the virtual camera. At this time, the scene display area is continuously updated according to a sensitivity corresponding to the movement speed of the virtual camera. When the dragging direction is determined to direct to an area where a specific event is located, the movement speed of the virtual camera will gradually increase, and an initial motion state is adjusted to an accelerated motion state until the virtual camera enters the area where the specific event is located. At this time, the scene display area is continuously updated according to the sensitivity corresponding to the speed of the virtual camera after the acceleration change. After the virtual camera enters the area where the specific event is located, the movement speed of the virtual camera will gradually decrease, and an accelerated motion state is adjusted to a decelerated motion state until the virtual camera leaves the area where the specific event is located. At this time, the scene display area is continuously updated according to the sensitivity corresponding to the speed of the virtual camera after the deceleration change. After the virtual camera leaves the area where the specific event is located, the movement speed of the virtual camera will gradually increase, and a decelerated motion state is adjusted to an accelerated motion state until the virtual camera is away from the area where the specific event is located. At this time, the scene display area is continuously updated according to the sensitivity corresponding to the speed of the virtual camera after the acceleration change.

Figure 3:
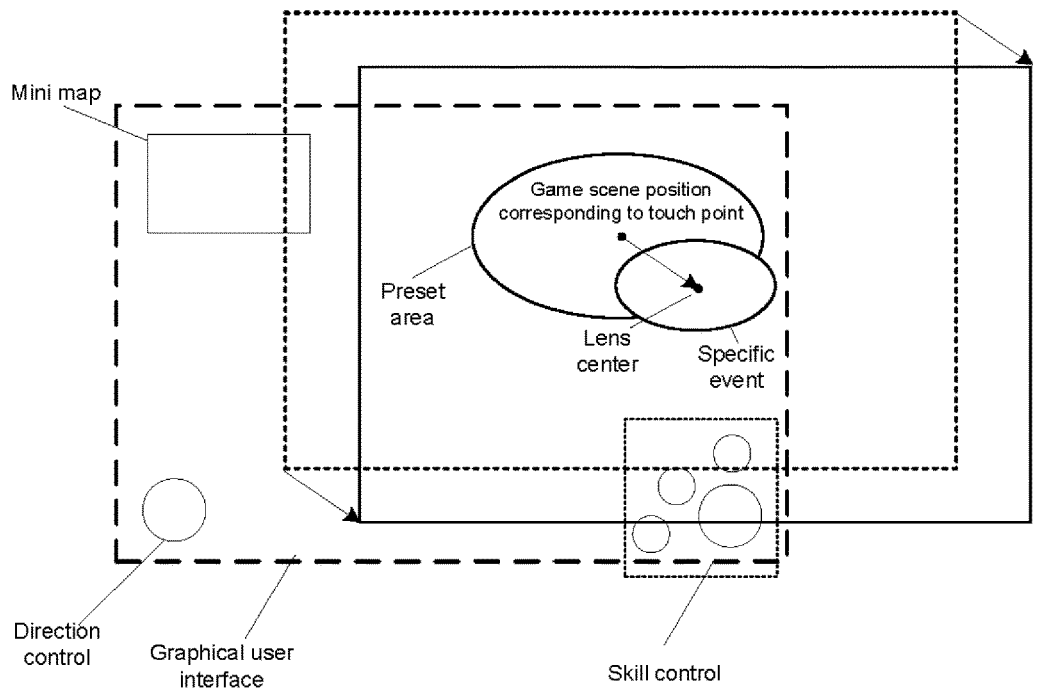
FIG. 3 is a schematic diagram of an in-game display control method according to a second optional embodiment of the present disclosure.

FIG. 3 is a schematic diagram of an in-game display control method according to a second optional embodiment of the present disclosure. As shown in FIG. 3, when a game player moves a virtual camera in a mini map area of a graphical user interface, the game player usually clicks directly near an area where a specific event is located by performing a clicking operation near the mini map, but fails to fall into the area where the specific event is located. Therefore, when the specific event exists around a touch point where the game player performs the clicking operation, the virtual camera will automatically shift to the area where the specific event is located until the virtual camera enters the area where the specific event is located.

By combining the foregoing embodiments, the following technical effects can be achieved.

At one, the comprehensive optimization of the current mainstream lens solutions has made up for the shortcomings of fixed and rigid lens modes in the current mainstream MOBA mobile game lens solutions and reliance on frequent operations by game players, which makes the operation of game lenses more flexible and intelligent. In addition, it has favorable extensibility, and leaves more design space for changes such as new gameplay methods and new characters to make the lens solution of the game more diversified and customized.

At two, for intelligent lens adjustment modes, according to differences of operating behaviors of game players and game situations where the game players are located, different ways of lens assistance are provided to meet the special needs of a game horizon, the fine adjustment operation of the lens is intelligentized, the operation burdens of the game players are reduced, and the game players can obtain current game information needed most in the most relaxed way, thereby improving the efficiency of game information transmission and providing the game players with a smoother game experience.

At three, game players and novice players with limited operation levels who are unable to use lens operations and receive battlefield information well can adapt to the game faster, and master game lens operation methods, and an intelligent solution is provided for a special lens operation, thereby reducing the learning cost of the game players, lowering the overall operation threshold of the game, and improving the coverage area of the corresponding user group of the game.

At four, the game players with high operation level are enabled to complete more fine game operations with the most convenient operations, thereby providing more room for improvement in the game skills of such game players, improving the game experience of such game players, and facilitating the retention of gamers at this level.

At five, as an overall optimization solution, it can adapt to the needs of game players at different levels and provide favorable conditions for the overall promotion and propagation of the game.

Through the description of the above implementation modes, those skilled in the art can clearly understand that the method according to the above embodiment may be implemented by means of software plus a necessary general hardware platform, and of course, may also be implemented through hardware, but in many cases, the former is a better implementation manner. Based on such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure.

In the present embodiment, an in-game display control apparatus is further provided, which is configured to implement the above embodiments and exemplary implementation manners, and the description thereof has been omitted. As used below, the term "component" may implement a combination of software and/or hardware of a predetermined function. Although the apparatus described in the following embodiments is optionally implemented by software, hardware or a combination of software and hardware is also possible and conceived.

Figure 4:
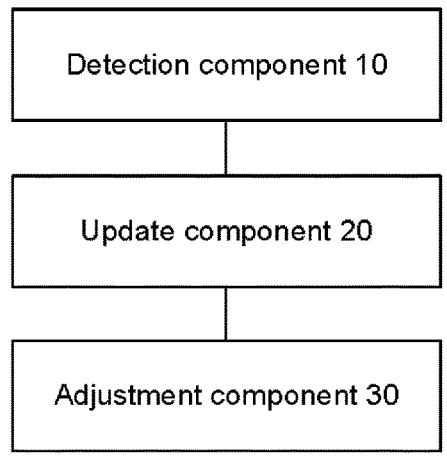
FIG. 4 is a structural block diagram of an in-game display control apparatus according to an embodiment of the present disclosure.

FIG. 4 is a structural block diagram of an in-game display control apparatus according to an embodiment of the present disclosure. As shown in FIG. 4, this apparatus is applied to a mobile terminal having at least one processor for executing a software application and a touch screen which is rendered with a graphical user interface, a game scene of a game includes a scene display area, the scene display area is at least part of the game scene, and contents rendered on the graphical user interface include the scene display area. The apparatus includes: a detection component 10, configured to detect a first touch operation acting on a preset area of the graphical user interface; an update component 20, configured to update the scene display area according to the first touch operation; and an adjustment component 30, configured to, when a preset specific event is detected to exist in a preset area of a game scene position corresponding to a touch point of the first touch operation, adjust an update mode of the scene display area according to the specific event.

Optionally, the adjustment component 30 is configured to adjust an update direction of the scene display area in the game scene according to a position where the specific event occurs.

Optionally, the update component 20 includes: a determination element (not shown in the figure), configured to determine an update direction of the scene display area in the game scene according to a movement direction of the touch point of the first touch operation; and an update element (not shown in the figure), configured to update the scene display area according to the update direction. The adjustment component 30 is configured to adjust an update speed of the scene display area in the game scene in the update direction according to a position where the specific event occurs.

Optionally, the update component 20 is configured to adjust an update speed of the scene display area with a first sensitivity according to a movement track of the touch point of the first touch operation.

Optionally, the adjustment component 30 includes: a first detection element (not shown in the figure), configured to detect a movement direction of the touch point of the first touch operation; and a first adjustment element (not shown in the figure), configured to, when the specific event is detected to exist in the preset area of the game scene position corresponding to the touch point of the first touch operation and the movement direction towards the specific event, adjust the update speed of the scene display area according to a second sensitivity.

Optionally, a virtual camera corresponding to a preset virtual character is configured in the game scene, and the scene display area is an area shot by the virtual camera.

Optionally, the update component 20 is configured to control the virtual camera to move at a first preset speed according to the movement track of the touch point of the first touch operation, and adjust the update speed of the scene display area with a first sensitivity.

Optionally, the adjustment component 30 includes: a second detection element (not shown in the figure), configured to detect a movement direction of the touch point of the first touch operation; and a second adjustment element (not shown in the figure), configured to, when the specific event is detected to exist in the preset area of the game scene position corresponding to the touch point of the first touch operation and the movement direction towards the specific event, control the virtual camera to move at a second preset speed according to the movement track of the touch point of the first touch operation, and adjust the update speed of the scene display area with a second sensitivity.

Figure 5:
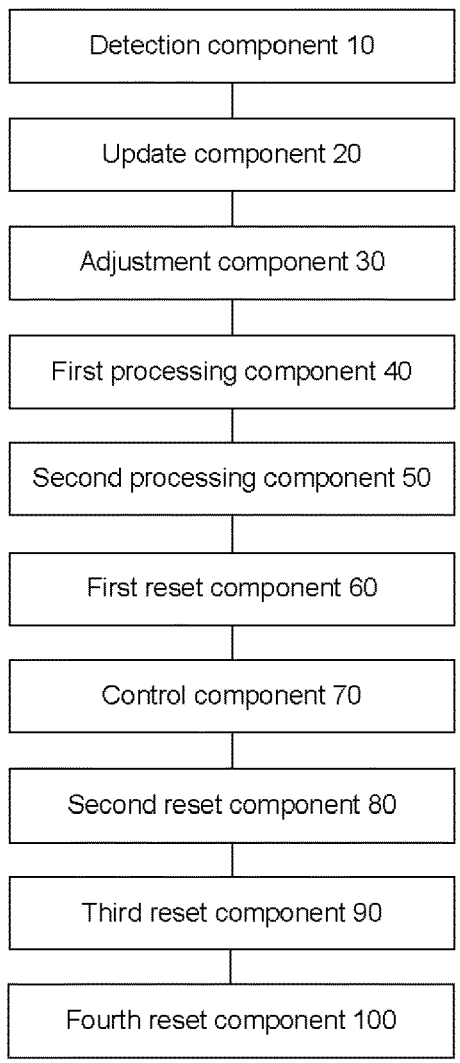
FIG. 5 is a structural block diagram of an in-game display control apparatus according to an optional embodiment of the present disclosure.

Optionally, FIG. 5 is a structural block diagram of an in-game display control apparatus according to an optional embodiment of the present disclosure. As shown in FIG. 5, the apparatus further includes: a first processing component 40, configured to detect the movement direction, and, when the movement direction is away from the specific event, control the virtual camera to move at a third preset speed according to the movement track of the touch point of the first touch operation to adjust the update speed of the scene display area.

Optionally, as shown in FIG. 5, the apparatus further includes: a second processing component 50, configured to, when the first touch operation ends, fix the virtual camera at a position where the specific event occurs.

Optionally, as shown in FIG. 5, the apparatus further includes: a first reset component 60, configured to detect a second touch operation acting on a preset position in the graphical user interface, and control the virtual camera to restore to a position of a preset virtual character according to the second touch operation.

Optionally, the detection component 10 is further configured to detect a third touch operation acting on a movement control area in the graphical user interface. As shown in FIG. 5, the apparatus further includes: a control component 70, configured to control the preset virtual character to move in the game scene according to the third touch operation; and a second reset component 80, configured to, when the preset virtual character is detected to move to a preset area of the specific event, control the virtual camera to restore to a position of the preset virtual character.

Optionally, as shown in FIG. 5, the apparatus further includes: a third reset component 90, configured to, when the specific event ends, control the virtual camera to restore to a position of the preset virtual character.

Optionally, as shown in FIG. 5, the apparatus further includes: a fourth reset component 100, configured to, when the first touch operation ends, control the virtual camera to restore to a position of the preset virtual character.

It is to be noted that each of the above components may be implemented by software or hardware. The latter may be implemented by, but not limited to, the following manners: the above components are all located in the same processor; or, the above components are located in different processors respectively in any combined form.

An embodiment of the present disclosure also provides a storage medium. The storage medium stores a computer program, and the computer program is configured to perform the steps in any one of the above method embodiments during running.

Optionally, in the present embodiment, the storage medium may be configured to store the computer program for performing the following steps.

At step S1, a first touch operation acting on a preset area of a graphical user interface is detected.

At step S2, a scene display area is updated according to the first touch operation.

At step S3, when a preset specific event is detected to exist in a preset area of a game scene position corresponding to a touch point of the first touch operation, an update mode of the scene display area is adjusted according to the specific event.

Optionally, in the present embodiment, the storage medium may include, but is not limited to, various media capable of storing a computer program such as a U disk, a Read-Only Memory (ROM), a Random Access Memory (RAM), a mobile hard disk, a magnetic disk or an optical disc.

Another embodiment of the present disclosure further provides a processor. The processor is configured to run a computer program to perform the steps in any one of the above method embodiments.

Optionally, in the present embodiment, the processor may be configured to perform the following steps through the computer program.

At step S1, a first touch operation acting on a preset area of a graphical user interface is detected.

At step S2, a scene display area is updated according to the first touch operation.

At step S3, when a preset specific event is detected to exist in a preset area of a game scene position corresponding to a touch point of the first touch operation, an update mode of the scene display area is adjusted according to the specific event.

The above serial numbers of the embodiments of the present disclosure are for the description, and do not represent the advantages and disadvantages of the embodiments.

In the above embodiments of the present disclosure, descriptions of each embodiment are emphasized respectively, and parts which are not elaborated in detail in a certain embodiment may refer to relevant descriptions of other embodiments.

In several embodiments provided by the present application, it is to be understood that the disclosed technical content may be implemented in other manners. The device embodiments described above are illustrative. For example, the division of the element may be a logical function division. In actual implementation, there may be another division manner, for example, multiple elements or components may be combined or integrated into another system, or some features may be ignored or not executed. In addition, the coupling or direct coupling or communication connection shown or discussed may be an indirect coupling or communication connection through some interfaces, elements or components, and may be electrical or otherwise.

The elements described as separate components may or may not be physically separated, and the members displayed as elements may or may not be physical elements, that is, may be located in one place, or may be distributed to multiple elements. Some or all of the elements may be selected according to actual needs to achieve the purpose of the solution of the present embodiment.

In addition, each functional element in each embodiment of the present disclosure may be integrated into one processing element, or each element may exist physically separately, or at least two elements may be integrated into one element. The integrated element may be implemented in a hardware form and may also be implemented in form of software functional element.

The integrated element may be stored in a computer-readable storage medium if being implemented in the form of a software functional element and sold or used as a standalone product. Based on such understanding, the technical solution of the present disclosure, which is essential or contributes to the conventional art, may be embodied in the form of a software product stored in a storage medium (such as a ROM/RAM, a magnetic disk and an optical disc), including a number of instructions for causing a terminal device (which may be a mobile phone, a computer, a server, or a network device, etc.) to perform the methods described in various embodiments of the present disclosure. The foregoing storage medium includes: a U disk, a ROM, a RAM, a mobile hard disk, a magnetic disk, or an optical disk, and the like, which may store a program code.

The above are exemplary implementation of the present disclosure. It is to be noted that a number of modifications and refinements may be made by those of ordinary skill in the art without departing from the principles of the present disclosure, and such modifications and refinements are also considered to be in the scope of protection of the present disclosure.

What is claimed is:

1. An in-game display control method, applied to a mobile terminal having at least one processor for executing a software application and a touch screen which is rendered with a graphical user interface, a game scene of a game comprising a scene display area, the scene display area being at least part of the game scene, contents rendered on the graphical user interface comprising the scene display area, the method comprising:

detecting a first touch operation acting on a preset area of the graphical user interface;

updating the scene display area according to the first touch operation; and in a process of updating the scene display area according to the first touch operation, when a preset specific event is detected to exist in a preset area of a game scene position in the game scene corresponding to a touch point of the first touch operation, adjusting an update mode of the scene display area according to the specific event to display the preset specific event.

2. The method as claimed in claim 1, wherein adjusting the update mode of the scene display area according to the specific event comprises:
adjusting an update direction of the scene display area in the game scene according to a position where the specific event occurs.

3. The method as claimed in claim 1, wherein
updating the scene display area according to the first touch operation comprises:
determining an update direction of the scene display area in the game scene according to a movement direction of the touch point of the first touch operation, and updating the scene display area according to the update direction; and
adjusting the update mode of the scene display area according to the specific event comprises:
adjusting an update speed of the scene display area in the game scene along the update direction according to a position where the specific event occurs.

4. The method as claimed in claim 1, wherein updating the scene display area according to the first touch operation comprises:
adjusting an update speed of the scene display area with a first sensitivity according to a movement track of the touch point of the first touch operation.

5. The method as claimed in claim 4, wherein when the specific event is detected to exist in the preset area of the game scene position, adjusting the update speed of the scene display area according to the specific event comprises:
detecting a movement direction of the touch point of the first touch operation; and
when the specific event is detected to exist in the preset area of the game scene position and the movement direction towards the specific event, adjusting the update speed of the scene display area according to a second sensitivity.

6. The method as claimed in claim 4, wherein a virtual camera corresponding to a preset virtual character is configured in the game scene, and the scene display area is an area shot by the virtual camera.

7. The method as claimed in claim 6, wherein updating the scene display area according to the first touch operation comprises:
controlling the virtual camera to move at a first preset speed according to the movement track of the touch point of the first touch operation, and adjusting the update speed of the scene display area with a first sensitivity.

8. The method as claimed in claim 7, wherein when the specific event is detected to exist in the preset area of the game scene position, adjusting the update speed of the scene display area according to the specific event comprises:
detecting a movement direction of the touch point of the first touch operation; and
when the specific event is detected to exist in the preset area of the game scene position and the movement direction towards the specific event, controlling the virtual camera to move at a second preset speed according to the movement track of the touch point of the first touch operation, and adjusting the update speed of the scene display area with a second sensitivity.

9. The method as claimed in claim 8, wherein after controlling the virtual camera to move to the specific event, the method further comprises:
detecting the movement direction; and
when the movement direction is away from the specific event, controlling the virtual camera to move at a third preset speed according to the movement track of the touch point of the first touch operation to adjust the update speed of the scene display area.

10. The method as claimed in claim 8, further comprising:
acquiring a position of the virtual camera in the game scene;
when the position of the virtual camera is outside a specific area of the specific event, controlling the virtual camera to move toward the specific area at the second preset speed according to the movement track of the touch point of the first touch operation;
when the position of the virtual camera is inside the specific area of the specific event, controlling the virtual camera to move at a fourth preset speed according to the movement track of the touch point of the first touch operation, and the fourth preset speed is less than the second preset speed.

11. The method as claimed in claim 6, wherein after controlling the virtual camera to move to the specific event, the method further comprises:
when the first touch operation ends, fixing the virtual camera at a position where the specific event occurs.

12. The method as claimed in claim 11, further comprising:
detecting a second touch operation acting on a preset position in the graphical user interface; and
controlling the virtual camera to restore to a position of the preset virtual character according to the second touch operation.

13. The method as claimed in claim 6, further comprising:
detecting a third touch operation acting on a movement control area in the graphical user interface;
controlling the preset virtual character to move in the game scene according to the third touch operation; and
when the preset virtual character is detected to move to a preset area of the specific event, controlling the virtual camera to restore to a position of the preset virtual character.

14. The method as claimed in claim 6, further comprising:
when the specific event ends, controlling the virtual camera to restore to a position of the preset virtual character.

15. The method as claimed in claim 6, further comprising:
when the first touch operation ends, controlling the virtual camera to restore to a position of the preset virtual character.

16. The method as claimed in claim 1, wherein the preset area is a horizon adjustment area in the graphical user interface, wherein the horizon adjustment area is an invisible touch area, or the preset area is a mini map area in the graphical user interface.

17. A non-transitory storage medium applied to an in-game display control method, comprising a stored program, wherein when the stored program is run, a device where the storage medium is located is controlled to perform the following steps:
detecting a first touch operation acting on a preset area of a graphical user interface;
updating a scene display area according to the first touch operation; and
in a process of updating the scene display area according to the first touch operation, when a preset specific event is detected to exist in a preset area of a game scene position in the game scene corresponding to a touch point of the first touch operation, adjusting an update mode of the scene display area according to the specific event to display the preset specific event.

18. A processor executing an in-game display control method, configured to run a program, wherein the program is run to perform the following steps:

detecting a first touch operation acting on a preset area of a graphical user interface;

updating a scene display area according to the first touch operation; and in a process of updating the scene display area according to the first touch operation, when a preset specific event is detected to exist in a preset area of a game scene position in the game scene corresponding to a touch point of the first touch operation, adjusting an update mode of the scene display area according to the specific event to display the preset specific event.

19. A terminal executing an in-game display control method, comprising: at least one processor, a memory, a display device, and at least one program, wherein the at least one program is stored in the memory, and configured to be run by the at least one processor, the at least one program being configured to perform the following steps:

detecting a first touch operation acting on a preset area of a graphical user interface;

updating a scene display area according to the first touch operation; and in a process of updating the scene display area according to the first touch operation, when a preset specific event is detected to exist in a preset area of a game scene position in the game scene corresponding to a touch point of the first touch operation, adjusting an update mode of the scene display area according to the specific event to display the preset specific event.

* * * * *